(12) United States Patent
White et al.

(10) Patent No.: US 8,601,521 B2
(45) Date of Patent: Dec. 3, 2013

(54) METHOD AND APPARATUS FOR MANAGING MEDIA CONTENT FROM AN OPTICAL DRIVE

(75) Inventors: Scott White, Austin, TX (US); James Cansler, Pflugerville, TX (US); Bradley Thompson, Austin, TX (US)

(73) Assignee: AT&T Intellectual Property I, LP, Atlanta, GA (US)

( * ) Notice: Subject to any disclaimer, the term of this patent is extended or adjusted under 35 U.S.C. 154(b) by 1005 days.

(21) Appl. No.: 12/024,482

(22) Filed: Feb. 1, 2008

(65) Prior Publication Data
US 2009/0199257 A1 Aug. 6, 2009

(51) Int. Cl.
*H04N 7/173* (2011.01)
(52) U.S. Cl.
USPC ............ 725/93; 725/131; 386/291; 386/332
(58) Field of Classification Search
USPC ............... 725/93, 131, 38; 709/217; 386/332
See application file for complete search history.

(56) References Cited

U.S. PATENT DOCUMENTS

| | | | |
|---|---|---|---|
| 2004/0181816 A1* | 9/2004 | Kim et al. | 725/138 |
| 2004/0187159 A1* | 9/2004 | Gaydos et al. | 725/92 |
| 2004/0250273 A1* | 12/2004 | Swix et al. | 725/25 |
| 2005/0235338 A1* | 10/2005 | AbiEzzi et al. | 725/142 |
| 2006/0117344 A1* | 6/2006 | Lamkin et al. | 725/38 |
| 2007/0011712 A1* | 1/2007 | White et al. | 725/112 |
| 2007/0056009 A1 | 3/2007 | Spilo et al. | |
| 2007/0078948 A1* | 4/2007 | Julia et al. | 709/217 |
| 2007/0107019 A1 | 5/2007 | Romano et al. | |
| 2008/0144501 A1* | 6/2008 | Nagy et al. | 370/235 |
| 2009/0003603 A1* | 1/2009 | Wessel et al. | 380/255 |
| 2009/0089184 A1* | 4/2009 | Boush | 705/27 |

* cited by examiner

*Primary Examiner* — Brian Pendleton
*Assistant Examiner* — Alan Luong
(74) *Attorney, Agent, or Firm* — Ralph Trementozzi; Guntin & Gust, PLC

(57) ABSTRACT

A system that incorporates teachings of the present disclosure may include, for example, a communication device having a controller to read media content from an optical storage medium inserted into an optical drive of the communication device, obtain one or more preferences of a set top box for presentation of the media content, adjust the media content from a current format into a target format based at least in part on the one or more preferences, and transmit the media content in the target format to the set top box. Other embodiments are disclosed.

25 Claims, 6 Drawing Sheets

200

400

METHOD AND APPARATUS FOR MANAGING MEDIA CONTENT FROM AN OPTICAL DRIVE

FIELD OF THE DISCLOSURE

The present disclosure relates generally to communication systems and more specifically to a method and apparatus for managing media content from an optical drive.

BACKGROUND

Selective viewing of media content, such as movies, remains a popular pastime. Due to the size of the media content, removable storage mediums can be a popular way to provide the media content to a viewer, as well as to share the content among different viewers.

An optical storage medium has the capacity to store media content of a large size, while maintaining a viewing quality desired by the viewer. DVDs, such as those rented from a rental store or a mail order service, can be obtained by a user and selectively viewed through use of an optical drive, such as incorporated into a personal computer or DVD player. However, viewing on a personal computer or on a DVD player can have a number of drawbacks. A personal computer can lack display quality due to the size and resolution of the computer's monitor, and often does not provide the same level of comfort because of the surrounding environment of the personal computer. Set top boxes often are not equipped with an optical drive due to their cost so that viewing from a DVD player can require purchasing of this additional component, as well as incorporating the component into the home entertainment circuit.

DETAILED DESCRIPTION

In one embodiment of the present disclosure, a computer-readable storage medium can have computer instructions for reading media content from an optical storage medium inserted into an optical drive of a processor, obtaining one or more preferences of a set top box for presentation of the media content, transcoding the media content from a current format into a target format based at least in part on the one or more preferences, and transmitting the media content in the target format from the processor to the set top box.

In another embodiment of the present disclosure, a set top box can have a controller to receive media content from a processor where the media content is read from an optical storage medium inserted into an optical drive of the processor, receive from the processor at least one of related media content associated with the media content and ancillary information associated with the media content where the related media content and the ancillary information are obtained by the processor from a query of one or more sources over the Internet, and provide a user of the set top box with access to a selected one of the related media content or the ancillary information.

In another embodiment of the present disclosure, a communication device can have a controller to read media content from an optical storage medium inserted into an optical drive of the communication device, obtain one or more preferences of a set top box for presentation of the media content, adjust the media content from a current format into a target format based at least in part on the one or more preferences, and transmit the media content in the target format to the set top box.

In another embodiment of the present disclosure, a method can involve providing to a processor one or more preferences of a set top box for presentation of a media content where the media content has been read from an optical storage medium inserted into an optical drive of the processor, receiving at the set top box the media content in a target format from the processor where the target format has been generated by the processor from a previous format of the media content based at least in part on the one or more preferences, and transmitting to the processor playback commands from the set top box to control presentation of the media content on a display device coupled to the set top box.

Figure 1:
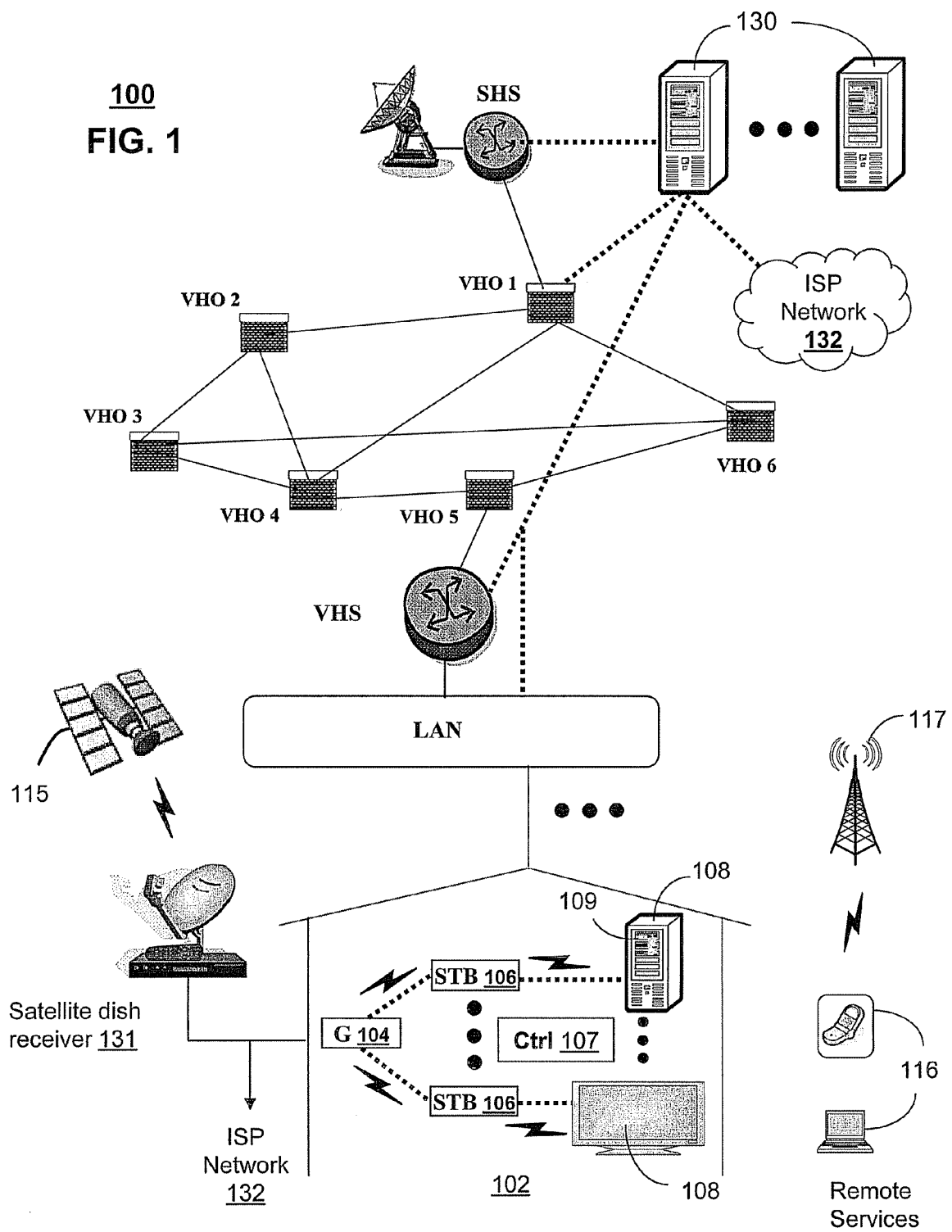
FIGS. 1-3 depict exemplary embodiments of communication systems that provide media services.

In another embodiment of the present disclosure, a method can involve reading media content from an optical storage medium inserted into an optical drive of a processor, receiving preference information from a set top box where the preference information is associated with a format for at least one of presentation of the media content by the set top box or delivery to the set top box, adjusting the media content from a current format into a target format based at least in part on the preference information, transmitting the media content in the target format from the processor to the set top box, receiving at the processor playback commands from the set top box, and controlling at the processor presentation of the media content on a display device coupled to the set top box based on the received playback commands FIG. 1 depicts an exemplary embodiment of a first communication system 100 for delivering media content. The communication system 100 can represent an IPTV broadcast media system. In a typical IPTV infrastructure, there is at least one super head-end office server (SHS) which receives national media programs from satellite and/or media servers from service providers of multimedia broadcast channels. In the present context, media programs can represent audio content, moving image content such as videos, still image content, and/or combinations thereof. The SHS server forwards IP packets associated with the media content to video head-end servers (VHS) via a network of aggregation points such as video head-end offices (VHO) according to a common multicast communication method.

The VHS then distributes multimedia broadcast programs via a local area network (LAN) to commercial and/or residential buildings 102 housing a gateway 104 (e.g., a residential gateway or RG). The LAN can represent a bank of digital subscriber line access multiplexers (DSLAMs) located in a central office or a service area interface that provide broadband services over optical links or copper twisted pairs to buildings 102. The gateway 104 distributes broadcast signals to media processors 106 such as Set-Top Boxes (STBs) or communication devices which in turn present broadcast selections to media devices 108 such as computers or television sets managed in some instances by a media controller 107 (e.g., an infrared or RF remote control). Unicast traffic can also be exchanged between the media processors 106 and subsystems of the IPTV media system for services such as video-on-demand (VoD). It will be appreciated by one of ordinary skill in the art that the media devices 108 and/or portable communication devices 116 shown in FIG. 1 can be an integral part of the media processor 106 and can be communicatively coupled to the gateway 104. In this particular embodiment, an integral device such as described can receive, respond, process and present multicast or unicast media content.

In one embodiment, one or more of the media devices 108 can include an optical drive 109 for reading digital media, such as a Digital Versatile Disc (DVD) or Compact Disc (CD) drive of a desktop computer 108. The media device 108 can be in communication with the STB 106, such as over a hardwire connection (e.g., a home network), wireless connection or both. In one embodiment, the media device 108 and STB 106 can be in communication over a High-Definition Multimedia Interface (HDMI). In another embodiment, the media processor 106 can be a Digital Video Recorder (DVR) that is in communication with the optical drive 109 of the media device 108, such as a laptop computer, over a wired and/or wireless connection. The present disclosure contemplates the use of optical drives 109 that are incorporated into, or otherwise provided by, other media devices, such as gaming consoles, audio systems and so forth. The media content that is being transported to the STB 106 can include video, audio and/or other data.

In one embodiment, the media device 108 can read the DVD or CD locally and then provide the content to the STB 106. The media device 108 can provide the content in a number of different ways, including streaming, progressive download, full download and so forth. In another embodiment, hard drive-based buffering can be utilized to provide steady playback of the content by the STB 106, such as where the home network has limited bandwidth. In another embodiment, the media device 108 can have components and can perform techniques for transcoding (e.g., direct digital-to-digital conversion) of the content of the DVD or CD prior to transport. In another embodiment, the media device 108 can have components and can perform techniques for transrating (e.g., coding to a lower bitrate without changing video formats) of the content of the DVD based on one or more preferences of the STB 106.

The IPTV media system can be coupled to one or more computing devices 130, a portion of which can operate as a web server for providing portal services over an Internet Service Provider (ISP) network 132 to fixed line media devices 108 or portable communication devices 116 by way of a wireless access point 117 providing Wireless Fidelity or WiFi services, or cellular communication services (e.g., GSM, CDMA, UMTS, WiMAX, etc.).

A satellite broadcast television system can be used in place of the IPTV media system. In this embodiment, signals transmitted by a satellite 115 can be intercepted by a satellite dish receiver 131 coupled to building 102 which conveys media signals to the media processors 106. The media receivers 106 can be equipped with a broadband port to the ISP network 132. Although not shown, the communication system 100 can also be combined or replaced with analog or digital broadcast distributions systems such as cable TV systems. Communication system 100 can also operate as an IP Multimedia Subsystem (IMS) conforming in part to protocols defined by standards bodies such as 3GPP (Third Generation Partnership Protocol).

Figure 2:
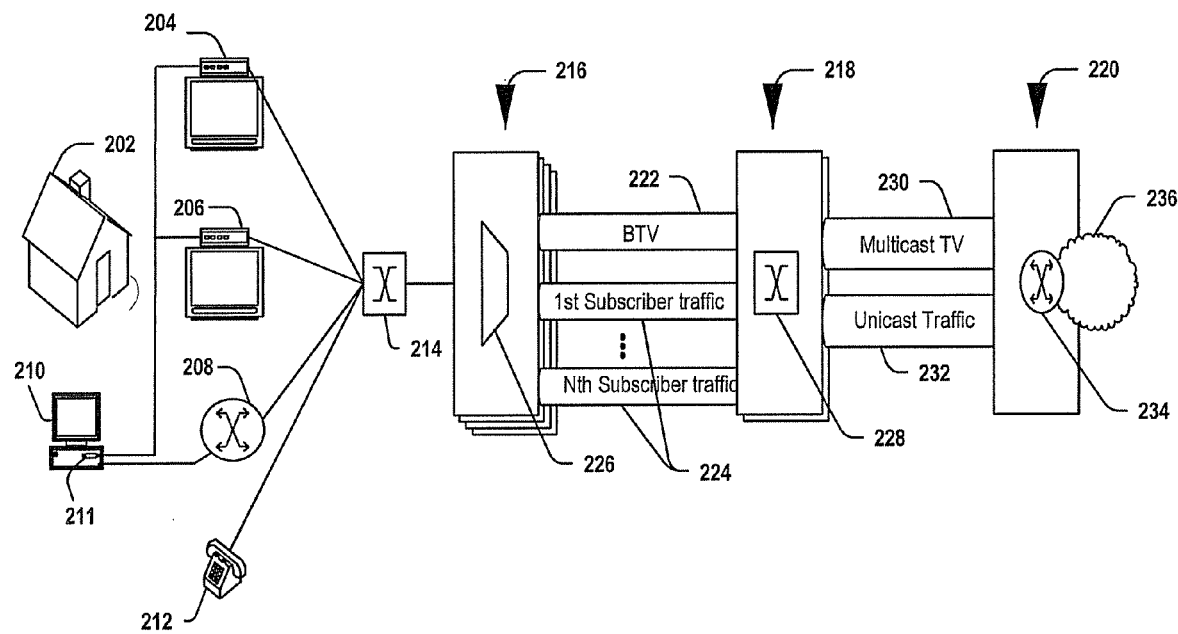

FIG. 2 depicts an exemplary embodiment of a second communication system 200 for delivering media content. Communication system 200 can be overlaid or operably coupled with communication system 100 as another representative embodiment of said communication system. The system 200 can include a distribution switch/router system 228 at a central office 218. The distribution switch/router system 228 can receive video data via a multicast television stream 230 from a second distribution switch/router 234 at an intermediate office 220. The multicast television stream 230 can include Internet Protocol (IP) data packets addressed to a multicast IP address associated with a television channel. The distribution switch/router system 228 can cache data associated with each television channel received from the intermediate office 220.

The distribution switch/router system 228 can also receive unicast data traffic from the intermediate office 220 via a unicast traffic stream 232. The unicast traffic stream 232 can include data packets related to devices located at a particular residence, such as the residence 202. For example, the unicast traffic stream 232 can include data traffic related to a digital subscriber line, a telephone line, another data connection, or any combination thereof. To illustrate, the unicast traffic stream 232 can communicate data packets to and from a telephone 212 associated with a subscriber at the residence 202. The telephone 212 can be a Voice over Internet Protocol (VoIP) telephone. To further illustrate, the unicast traffic stream 232 can communicate data packets to and from a personal computer 210 at the residence 202 via one or more data routers 208. In an additional illustration, the unicast traffic stream 232 can communicate data packets to and from a set-top box device, such as the set-top box devices 204, 206. The unicast traffic stream 232 can communicate data packets to and from the devices located at the residence 202 via one or more residential gateways 214 associated with the residence 202. The personal computer 210 can be in communication with one or more of the STB's 204, 206 for transport of media content from an optical drive 211 reading an optical storage device, such as a DVD or CD.

The distribution switch/router system 228 can send data to one or more access switch/router systems 226. The access switch/router system 226 can include or be included within a service area interface 216. In a particular embodiment, the access switch/router system 226 can include a DSLAM. The access switch/router system 226 can receive data from the distribution switch/router system 228 via a broadcast television (BTV) stream 222 and a plurality of unicast subscriber traffic streams 224. The BTV stream 222 can be used to communicate video data packets associated with a multicast stream.

For example, the BTV stream 222 can include a multicast virtual local area network (VLAN) connection between the distribution switch/router system 228 and the access switch/router system 226. Each of the plurality of subscriber traffic streams 224 can be used to communicate subscriber specific data packets. For example, the first subscriber traffic stream can communicate data related to a first subscriber, and the nth subscriber traffic stream can communicate data related to an nth subscriber. Each subscriber to the system 200 can be associated with a respective subscriber traffic stream 224. The subscriber traffic stream 224 can include a subscriber VLAN connection between the distribution switch/router system 228 and the access switch/router system 226 that is associated with a particular set-top box device 204, 206, a particular residence 202, a particular residential gateway 214, another device associated with a subscriber, or any combination thereof.

In an illustrative embodiment, a set-top box device, such as the set-top box device 204, can receive a channel change command from an input device, such as a remoter control device. The channel change command can indicate selection of an IPTV channel. After receiving the channel change command, the set-top box device 204 can generate channel selection data that indicates the selection of the IPTV channel. The set-top box device 204 can send the channel selection data to the access switch/router system 226 via the residential gateway 214. The channel selection data can include an Internet Group Management Protocol (IGMP) Join request. In an illustrative embodiment, the access switch/router system 226 can identify whether it is joined to a multicast group associated with the requested channel based on information in the IGMP Join request.

If the access switch/router system 226 is not joined to the multicast group associated with the requested channel, the access switch/router system 226 can generate a multicast stream request. The multicast stream request can be generated by modifying the received channel selection data. In an illustrative embodiment, the access switch/router system 226 can modify an IGMP Join request to produce a proxy IGMP Join request. The access switch/router system 226 can send the multicast stream request to the distribution switch/router system 228 via the BTV stream 222. In response to receiving the multicast stream request, the distribution switch/router system 228 can send a stream associated with the requested channel to the access switch/router system 226 via the BTV stream 222.

Figure 3:
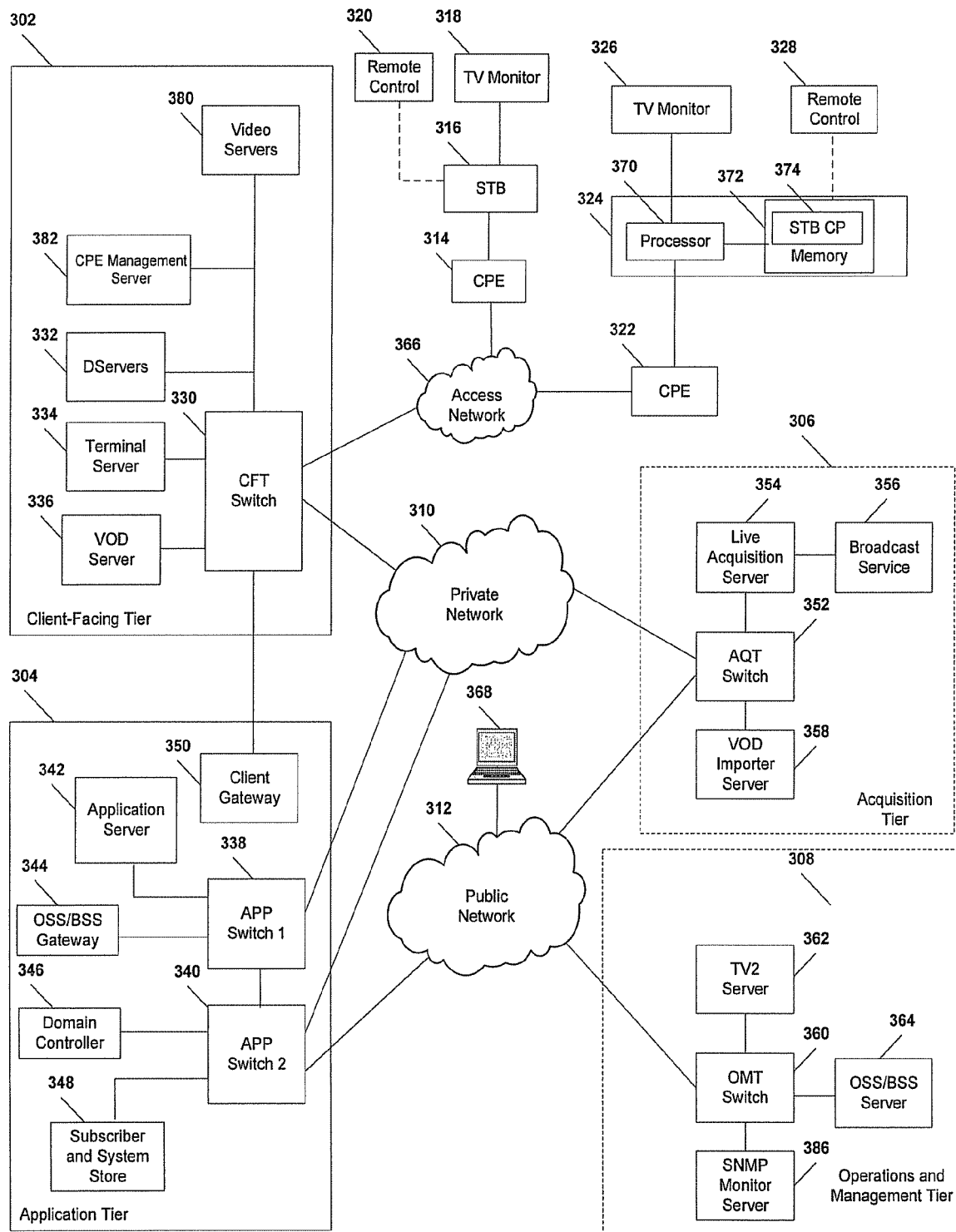

FIG. 3 depicts an exemplary embodiment of a third communication system 300 for delivering media content. Communication system 300 can be overlaid or operably coupled with communication systems 100-200 as another representative embodiment of said communication systems. As shown, the system 300 can include a client facing tier 302, an application tier 304, an acquisition tier 306, and an operations and management tier 308. Each tier 302, 304, 306, 308 is coupled to a private network 310, such as a network of common packet-switched routers and/or switches; to a public network 312, such as the Internet; or to both the private network 310 and the public network 312. For example, the client-facing tier 302 can be coupled to the private network 310. Further, the application tier 304 can be coupled to the private network 310 and to the public network 312. The acquisition tier 306 can also be coupled to the private network 310 and to the public network 312. Additionally, the operations and management tier 308 can be coupled to the public network 322.

As illustrated in FIG. 3, the various tiers 302, 304, 306, 308 communicate with each other via the private network 310 and the public network 312. For instance, the client-facing tier 302 can communicate with the application tier 304 and the acquisition tier 306 via the private network 310. The application tier 304 can communicate with the acquisition tier 306 via the private network 310. Further, the application tier 304 can communicate with the acquisition tier 306 and the operations and management tier 308 via the public network 312. Moreover, the acquisition tier 306 can communicate with the operations and management tier 308 via the public network 312. In a particular embodiment, elements of the application tier 304, including, but not limited to, a client gateway 350, can communicate directly with the client-facing tier 302.

The client-facing tier 302 can communicate with user equipment via an access network 366, such as an IPTV access network. In an illustrative embodiment, customer premises equipment (CPE) 314, 322 can be coupled to a local switch, router, or other device of the access network 366. The client-facing tier 302 can communicate with a first representative set-top box device 316 via the first CPE 314 and with a second representative set-top box device 324 via the second CPE 322. In a particular embodiment, the first representative set-top box device 316 and the first CPE 314 can be located at a first customer premise, and the second representative set-top box device 324 and the second CPE 322 can be located at a second customer premise.

In another particular embodiment, the first representative set-top box device 316 and the second representative set-top box device 324 can be located at a single customer premise, both coupled to one of the CPE 314, 322. The CPE 314, 322 can include routers, local area network devices, modems, such as digital subscriber line (DSL) modems, any other suitable devices for facilitating communication between a set-top box device and the access network 366, or any combination thereof. In one embodiment, one or more of the CPEs 314, 322 can include optical drives and can be in communication with one or more of the STB's 316, 324 for transport of media content from a reading of an optical storage device, such as a DVD or CD.

In an exemplary embodiment, the client-facing tier 302 can be coupled to the CPE 314, 322 via fiber optic cables. In another exemplary embodiment, the CPE 314, 322 can include DSL modems that are coupled to one or more network nodes via twisted pairs, and the client-facing tier 302 can be coupled to the network nodes via fiber-optic cables. Each set-top box device 316, 324 can process data received via the access network 366, via a common IPTV software platform.

The first set-top box device 316 can be coupled to a first external display device, such as a first television monitor 318, and the second set-top box device 324 can be coupled to a second external display device, such as a second television monitor 326. Moreover, the first set-top box device 316 can communicate with a first remote control 320, and the second set-top box device 324 can communicate with a second remote control 328. The set-top box devices 316, 324 can include IPTV set-top box devices; video gaming devices or consoles that are adapted to receive IPTV content; personal computers or other computing devices that are adapted to emulate set-top box device functionalities; any other device adapted to receive IPTV content and transmit data to an IPTV system via an access network; or any combination thereof.

In an exemplary, non-limiting embodiment, each set-top box device 316, 324 can receive data, video, or any combination thereof, from the client-facing tier 302 via the access network 366 and render or display the data, video, or any combination thereof, at the display device 318, 326 to which it is coupled. In an illustrative embodiment, the set-top box devices 316, 324 can include tuners that receive and decode television programming signals or packet streams for transmission to the display devices 318, 326. Further, the set-top box devices 316, 324 can each include a STB processor 370 and a STB memory device 372 that is accessible to the STB processor 370. In one embodiment, a computer program, such as the STB computer program 374, can be embedded within the STB memory device 372.

In an illustrative embodiment, the client-facing tier 302 can include a client-facing tier (CFT) switch 330 that manages communication between the client-facing tier 302 and the access network 366 and between the client-facing tier 302 and the private network 310. As illustrated, the CFT switch 330 is coupled to one or more distribution servers, such as Distribution-servers (D-servers) 332, that store, format, encode, replicate, or otherwise manipulate or prepare video content for communication from the client-facing tier 302 to the set-top box devices 316, 324. The CFT switch 330 can also be coupled to a terminal server 334 that provides terminal devices with a point of connection to the IPTV system 300 via the client-facing tier 302.

In a particular embodiment, the CFT switch 330 can be coupled to a video-on-demand (VOD) server 336 that stores or provides VOD content imported by the IPTV system 300. Further, the CFT switch 330 is coupled to one or more video servers 380 that receive video content and transmit the content to the set-top boxes 316, 324 via the access network 366. The client-facing tier 302 may include a CPE management server 382 that manages communications to and from the CPE 314 and the CPE 322. For example, the CPE management server 382 may collect performance data associated with the set-top box devices 316, 324 from the CPE 314 or the CPE 322 and forward the collected performance data to a server associated with the operations and management tier 308.

In an illustrative embodiment, the client-facing tier 302 can communicate with a large number of set-top boxes, such as the representative set-top boxes 316, 324, over a wide geographic area, such as a metropolitan area, a viewing area, a statewide area, a regional area, a nationwide area or any other suitable geographic area, market area, or subscriber or customer group that can be supported by networking the client-facing tier 302 to numerous set-top box devices. In a particular embodiment, the CFT switch 330, or any portion thereof, can include a multicast router or switch that communicates with multiple set-top box devices via a multicast-enabled network.

As illustrated in FIG. 3, the application tier 304 can communicate with both the private network 310 and the public network 312. The application tier 304 can include a first application tier (APP) switch 338 and a second APP switch 340. In a particular embodiment, the first APP switch 338 can be coupled to the second APP switch 340. The first APP switch 338 can be coupled to an application server 342 and to an OSS/BSS gateway 344. In a particular embodiment, the application server 342 can provide applications to the set-top box devices 316, 324 via the access network 366, which enable the set-top box devices 316, 324 to provide functions, such as interactive program guides, video gaming, display, messaging, processing of VOD material and other IPTV content, etc. In an illustrative embodiment, the application server 342 can provide location information to the set-top box devices 316, 324. In a particular embodiment, the OSS/BSS gateway 344 includes operation systems and support (OSS) data, as well as billing systems and support (BSS) data. In one embodiment, the OSS/BSS gateway 344 can provide or restrict access to an OSS/BSS server 364 that stores operations and billing systems data.

The second APP switch 340 can be coupled to a domain controller 346 that provides Internet access, for example, to users at their computers 368 via the public network 312. For example, the domain controller 346 can provide remote Internet access to IPTV account information, e-mail, personalized Internet services, or other online services via the public network 312. In addition, the second APP switch 340 can be coupled to a subscriber and system store 348 that includes account information, such as account information that is associated with users who access the IPTV system 300 via the private network 310 or the public network 312. In an illustrative embodiment, the subscriber and system store 348 can store subscriber or customer data and create subscriber or customer profiles that are associated with IP addresses, stockkeeping unit (SKU) numbers, other identifiers, or any combination thereof, of corresponding set-top box devices 316, 324. In another illustrative embodiment, the subscriber and system store can store data associated with capabilities of set-top box devices associated with particular customers.

In a particular embodiment, the application tier 304 can include a client gateway 350 that communicates data directly to the client-facing tier 302. In this embodiment, the client gateway 350 can be coupled directly to the CFT switch 330. The client gateway 350 can provide user access to the private network 310 and the tiers coupled thereto. In an illustrative embodiment, the set-top box devices 316, 324 can access the IPTV system 300 via the access network 366, using information received from the client gateway 350. User devices can access the client gateway 350 via the access network 366, and the client gateway 350 can allow such devices to access the private network 310 once the devices are authenticated or verified. Similarly, the client gateway 350 can prevent unauthorized devices, such as hacker computers or stolen set-top box devices from accessing the private network 310, by denying access to these devices beyond the access network 366.

For example, when the first representative set-top box device 316 accesses the client-facing tier 302 via the access network 366, the client gateway 350 can verify subscriber information by communicating with the subscriber and system store 348 via the private network 310. Further, the client gateway 350 can verify billing information and status by communicating with the OSS/BSS gateway 344 via the private network 310. In one embodiment, the OSS/BSS gateway 344 can transmit a query via the public network 312 to the OSS/BSS server 364. After the client gateway 350 confirms subscriber and/or billing information, the client gateway 350 can allow the set-top box device 316 to access IPTV content and VOD content at the client-facing tier 302. If the client gateway 350 cannot verify subscriber information for the set-top box device 316, e.g., because it is connected to an unauthorized twisted pair, the client gateway 350 can block transmissions to and from the set-top box device 316 beyond the access network 366.

As indicated in FIG. 3, the acquisition tier 306 includes an acquisition tier (AQT) switch 352 that communicates with the private network 310. The AQT switch 352 can also communicate with the operations and management tier 308 via the public network 312. In a particular embodiment, the AQT switch 352 can be coupled to one or more live Acquisition-servers (A-servers) 354 that receive or acquire television content, movie content, advertisement content, other video content, or any combination thereof, from a broadcast service 356, such as a satellite acquisition system or satellite head-end office. In a particular embodiment, the live acquisition server 354 can transmit content to the AQT switch 352, and the AQT switch 352 can transmit the content to the CFT switch 330 via the private network 310.

In an illustrative embodiment, content can be transmitted to the D-servers 332, where it can be encoded, formatted, stored, replicated, or otherwise manipulated and prepared for communication from the video server(s) 380 to the set-top box devices 316, 324. The CFT switch 330 can receive content from the video server(s) 380 and communicate the content to the CPE 314, 322 via the access network 366. The set-top box devices 316, 324 can receive the content via the CPE 314, 322, and can transmit the content to the television monitors 318, 326. In an illustrative embodiment, video or audio portions of the content can be streamed to the set-top box devices 316, 324.

Further, the AQT switch 352 can be coupled to a video-on-demand importer server 358 that receives and stores television or movie content received at the acquisition tier 306 and communicates the stored content to the VOD server 336 at the client-facing tier 302 via the private network 310. Additionally, at the acquisition tier 306, the video-on-demand (VOD) importer server 358 can receive content from one or more VOD sources outside the IPTV system 300, such as movie studios and programmers of non-live content. The VOD importer server 358 can transmit the VOD content to the AQT switch 352, and the AQT switch 352, in turn, can communicate the material to the CFT switch 330 via the private network 310. The VOD content can be stored at one or more servers, such as the VOD server 336.

When users issue requests for VOD content via the set-top box devices 316, 324, the requests can be transmitted over the access network 366 to the VOD server 336, via the CFT switch 330. Upon receiving such requests, the VOD server 336 can retrieve the requested VOD content and transmit the content to the set-top box devices 316, 324 across the access network 366, via the CFT switch 330. The set-top box devices 316, 324 can transmit the VOD content to the television monitors 318, 326. In an illustrative embodiment, video or audio portions of VOD content can be streamed to the set-top box devices 316, 324.

FIG. 3 further illustrates that the operations and management tier 308 can include an operations and management tier (OMT) switch 360 that conducts communication between the operations and management tier 308 and the public network 312. In the embodiment illustrated by FIG. 3, the OMT switch 360 is coupled to a TV2 server 362. Additionally, the OMT switch 360 can be coupled to an OSS/BSS server 364 and to a simple network management protocol monitor 386 that monitors network devices within or coupled to the IPTV system 300. In a particular embodiment, the OMT switch 360 can communicate with the AQT switch 352 via the public network 312.

The OSS/BSS server 364 may include a cluster of servers, such as one or more CPE data collection servers that are adapted to request and store operations systems data, such as performance data from the set-top box devices 316, 324. In an illustrative embodiment, the CPE data collection servers may be adapted to analyze performance data to identify a condition of a physical component of a network path associated with a set-top box device, to predict a condition of a physical component of a network path associated with a set-top box device, or any combination thereof.

In an illustrative embodiment, the live acquisition server 354 can transmit content to the AQT switch 352, and the AQT switch 352, in turn, can transmit the content to the OMT switch 360 via the public network 312. In this embodiment, the OMT switch 360 can transmit the content to the TV2 server 362 for display to users accessing the user interface at the TV2 server 362. For example, a user can access the TV2 server 362 using a personal computer 368 coupled to the public network 312.

It should be apparent to one of ordinary skill in the art from the foregoing media system embodiments that other suitable media systems for distributing broadcast media content, as well as peer-to-peer exchange of content, can be applied to the present disclosure.

Figure 4:
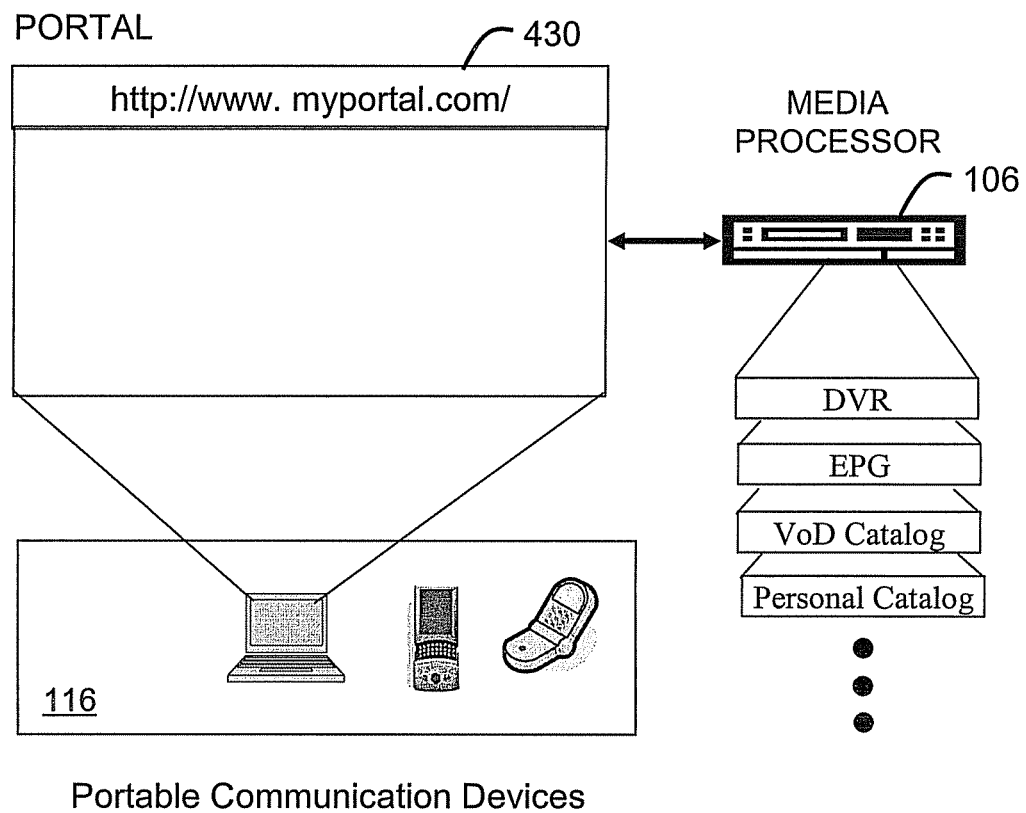
FIG. 4 depicts an exemplary embodiment of a portal interacting with at least one among the communication systems of FIGS. 1-3.

FIG. 4 depicts an exemplary embodiment of a portal 430. The portal 430 can be used for managing services of communication systems 100-300. The portal 430 can be accessed by a Uniform Resource Locator (URL) with a common Internet browser such as Microsoft's Internet Explorer using an Internet-capable communication device such as references 108, 116, or 210 of FIGS. 1-2. The portal 430 can be configured to access a media processor such as references 106, 204, 206, 316, and 324 of FIGS. 1-3 and services managed thereby such as a DVR, an Electronic Programming Guide (EPG), VOD catalog, a personal catalog stored in the STB (e.g., personal videos, pictures, audio recordings, etc.), and so on.

Figure 5:
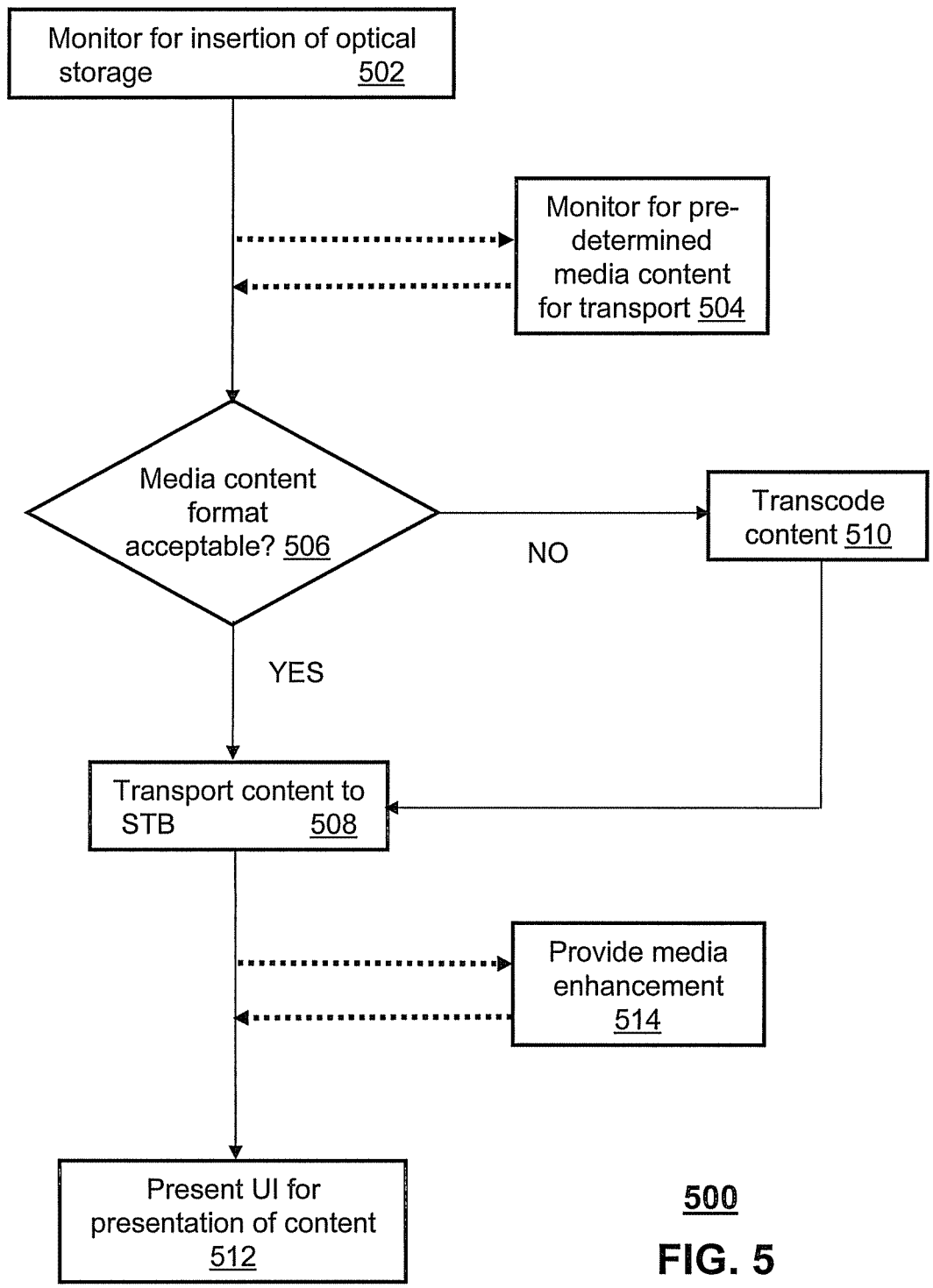
FIG. 5 depicts an exemplary method operating in portions of the communication systems of FIGS. 1-3.

FIG. 5 depicts an exemplary method 500 operating in portions of one or more of the communication systems 100-300. Method 500 has variants as depicted by the dashed lines. It would be apparent to an artisan with ordinary skill in the art that other embodiments not depicted in FIG. 5 are possible without departing from the scope of the claims described below. For convenience, the term STB 106 as used in the following paragraphs can mean any of the media processors or STBs 106, 204, 206, 316, 324 singly or in combination, and the term computer or media device 108 can mean devices or CPE 108, 210, 314, and 322 singly or in combination, which have an optical drive, such as optical drives 109 or 211.

Method 500 begins with step 502 where the computer 108 can monitor for insertion of an optical storage medium, such as a DVD or CD into its optical drive 109. In one embodiment as in step 504, the computer 108 can detect the presence of the DVD or CD in its optical drive 109 and determine if the content of the DVD or CD is intended for transport to the STB 106. For example, one or more DVDs, CDs or media contents can be designated by a user for transport to one or more of the STBs 106. The time frame for transport can vary. For example, if designated for transport, media content can be immediately transported to the STB 106 or can be delayed, such as based on a selection of a user.

In another embodiment, the designation for transport to the STB 106 can be based on types of DVDs, CDs, or media content. For instance, a user can designate all content on an optical storage medium that is in video format (e.g., MPEG-4) to be delivered to the STB 106. In another embodiment, the media device can utilize a header or other indicia of content in combination with the user's designation to determine if transport to the STB 106 should occur. The designation for transport can be inputted by a user at any time and can be done at the computer 108, the STB 106 or both. For instance, a user can select a designation of transporting all video content over 30 minutes in length to the STB 106. This designation can be stored in the computer 108 or can otherwise be accessible, such as via a request by the computer for any active designations from a memory of the STB 106.

In another embodiment, software for transporting DVD or CD content from the optical drive 109 to the STB 106 can be resident in the system tray of the media device 108. Upon insertion of the DVD or CD, the software can commence the transport process, including buffering of the optical media content.

In step 506, the computer 108 can determine if the current format of the media content is in an acceptable format for delivery to, and/or presentation by, the STB 106. An acceptable format can be a preferred format, as designated by a user and/or as determined by one or more of the STB 106 and the computer 108. An acceptable format can also be a compatible format, such as for a media processor that is limited to presentation of particular formats of data. If the media content is in an acceptable format then in step 508 the computer 108 can commence transport, such as through streaming, progressive download and so forth. If on the other hand, the media content is not in an acceptable format then in step 510 the computer 108 can transcode the media content into an acceptable format and transport the media content to the STB as back in step 508.

In one embodiment, the computer 108 can adjust the current format to the targeted format using techniques other than transcoding, such as transrating. In another embodiment, the computer 108 can transcode, or otherwise adjust the format of, the content of the DVD or CD based on one or more preferences associated with the STB 106 or the media display device. For example, the transcoding can include decoding and decompressing the original data of the DVD or CD to a raw intermediate format (e.g., Pulse Code Modulation (PCM) for audio content or YUV for video content) and then re-encoding into a target format. For instance, the computer 108 can transcode video content between MPEG-2 files to the MPEG-4 format, such as to reduce the size of the video files. The computer 108 can also transcode the media content from the DVD or CD into other targeted or preferred formats, including more compatible formats for presentation by the STB 106 and/or a display unit, such as where the STB or other media processor does not support a particular format.

In another embodiment, the computer 108 can transrate the content of the DVD based on one or more preferences associated with the STB 106 or the media display device. In yet another embodiment, the computer 108 can transsize (e.g., changing the picture size of video) the video content based on preferences associated with the STB 106 or media display device.

In one embodiment, the preferences of the STB 106 (or other media processor) and/or the media display device can be inputted by a user at any time and can be done at the computer 108, the STB 106 or both. For instance, a user can select a preferred format of all video content to be transported to the STB 106, such as reducing size to speed up the delivery. These preferences can be stored in the computer 108 or can be otherwise accessible, such as via a request by the computer for any active preferences from a memory of the STB 106.

In another embodiment, the computer 108 can determine preferences of the STB 106 (or other media processor) and/or the media display device, such as through querying the STB. For example, the STB 106 can provide data as to setting that have already been selected by the user for other viewing and the computer can determine preferences based on this data. As another example, the computer 108 can retrieve preferences from a remote location, such as a database, based on a model number or other indicia of the STB and/or the media display device. The retrieval of the preferences can be based in part on user input, such as of the model of the device or of the user's own preferences. The use of the term preferences can include formats or other characteristics of the media content that are preferred over other formats or other characteristics, as well as formats or other characteristics that are compatible with operation of a particular media processor and/or display device.

In step 512, the computer 108 can present a user interface (UI) on a media display device for control of the media content. For example, the UI can include playback commands (e.g., play, pause, rewind, and so forth) to allow a user to control playback of the media content. The playback commands can be implemented at the computer 108 or at the STB, depending on the transport technique utilized for delivering the media content to the STB.

In one embodiment in step 514, media enhancement such as related video content (e.g., sequels, prequels, related movies, similar genre, same actors, and so forth) or ancillary information associated with the media content, can be retrieved by the computer 108 and provided to the STB for presentation. The ancillary information can vary, and can include blogs (e.g., video blogs), pod casts, related websites, unrelated websites with related information, and so forth. In another embodiment, the ancillary information can include hard goods that are associated with the media content, such as clothing, ornaments and other items that can be offered for sale. The ancillary information can be based upon a search of the Internet for such information, and can include a search of known databases that store related media content. The form of presentation by the STB 106 can vary, such as a pop-up window or semi-transparent graphics.

Upon reviewing the aforementioned embodiments, it would be evident to an artisan with ordinary skill in the art that said embodiments can be modified, reduced, or enhanced without departing from the scope and spirit of the claims described below. In one embodiment, the computer 108 can be used for configuring presentation of the media content at various media processors throughout the premises. For example, the computer 108 can determine a rating or type of a media content and deliver the content to a designated STB, such as a children's room for G-rated content or cartoons. As another example, the computer can simultaneously deliver audio content to a plurality of audio media processors positioned throughout the premises. In another embodiment, the computer 108 can include encryption technology or have access thereto, such as public and private key encryption methodology, so that the media content being transported from the optical drive 109 to the STB 106 can be encrypted.

Other suitable modifications that can be applied to the present disclosure without departing from the scope of the claims below. Accordingly, the reader is directed to the claims section for a fuller understanding of the breadth and scope of the present disclosure.

Figure 6:
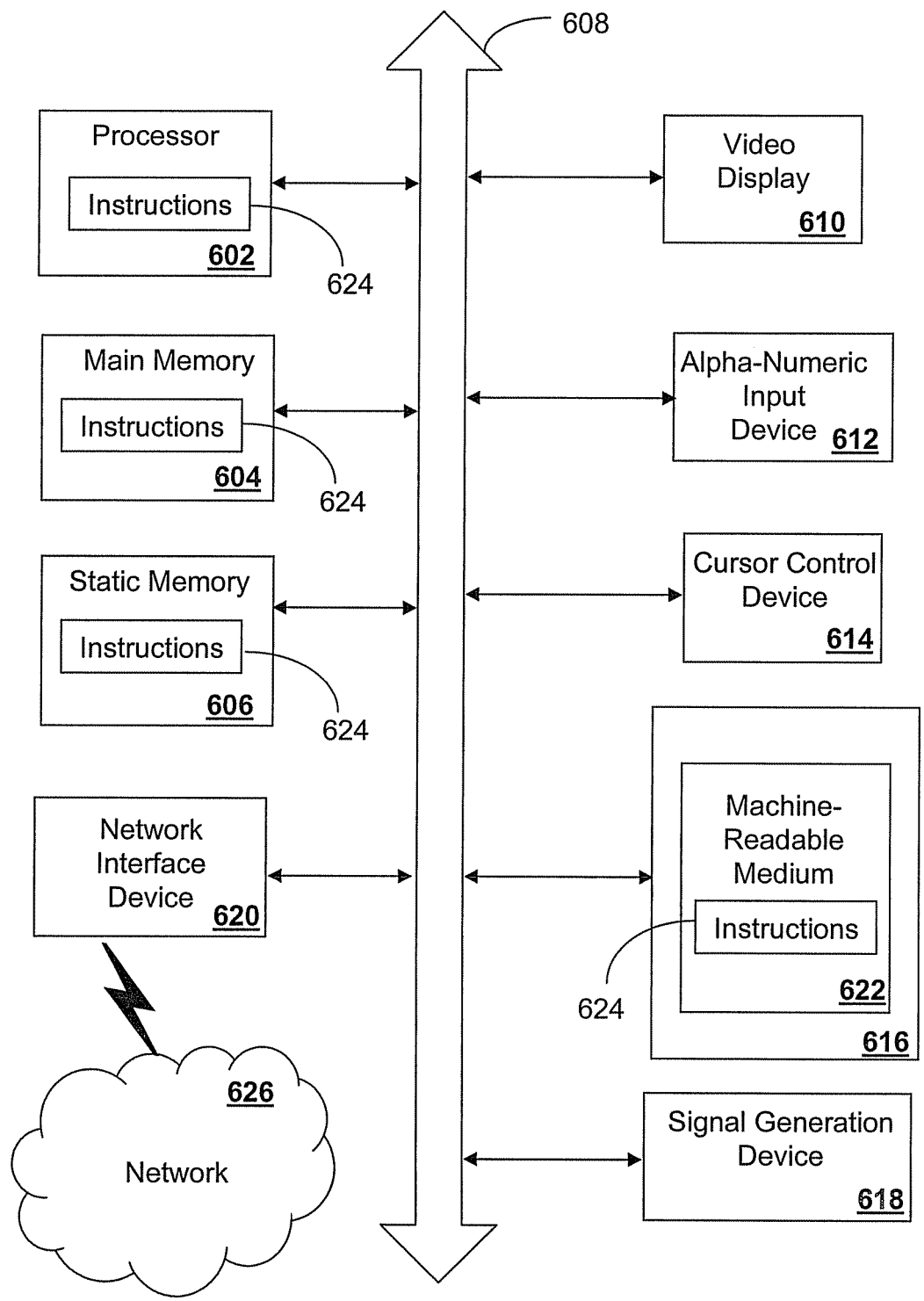
FIG. 6 is a diagrammatic representation of a machine in the form of a computer system within which a set of instructions, when executed, may cause the machine to perform any one or more of the methodologies discussed herein.

FIG. 6 depicts an exemplary diagrammatic representation of a machine in the form of a computer system 600 within which a set of instructions, when executed, may cause the machine to perform any one or more of the methodologies discussed above. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 600 may include a processor 602 (e.g., a central processing unit (CPU), a graphics processing unit (GPU, or both), a main memory 604 and a static memory 606, which communicate with each other via a bus 608. The computer system 600 may further include a video display unit 610 (e.g., a liquid crystal display (LCD), a flat panel, a solid state display, or a cathode ray tube (CRT)). The computer system 600 may include an input device 612 (e.g., a keyboard), a cursor control device 614 (e.g., a mouse), a disk drive unit 616, a signal generation device 618 (e.g., a speaker or remote control) and a network interface device 620.

The disk drive unit 616 may include a machine-readable medium 622 on which is stored one or more sets of instructions (e.g., software 624) embodying any one or more of the methodologies or functions described herein, including those methods illustrated above. The instructions 624 may also reside, completely or at least partially, within the main memory 604, the static memory 606, and/or within the processor 602 during execution thereof by the computer system 600. The main memory 604 and the processor 602 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium containing instructions 624, or that which receives and executes instructions 624 from a propagated signal so that a device connected to a network environment 626 can send or receive voice, video or data, and to communicate over the network 626 using the instructions 624. The instructions 624 may further be transmitted or received over a network 626 via the network interface device 620.

While the machine-readable medium 622 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure.

The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and carrier wave signals such as a signal embodying computer instructions in a transmission medium; and/or a digital file attachment to e-mail or other self-contained information archive or set of archives is considered a distribution medium equivalent to a tangible storage medium. Accordingly, the disclosure is considered to include any one or more of a machine-readable medium or a distribution medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A non-transitory computer-readable storage medium, comprising computer instructions which, responsive to being executed by a processor, cause the processor to perform operations comprising:

reading media content from an optical storage medium inserted into an optical drive of a processor;

determining a content type of the media content;

selecting a particular set top box from a plurality of set top boxes to receive the media content, wherein the selecting of the particular set top box is based on the content type of the media content, wherein the selecting of the particular set top box is performed without user intervention in response to the reading of the media content from of the optical storage medium inserted into the optical drive;

obtaining, responsive to the content type of the media content, a preference of a plurality of preferences of the particular set top box to present the media content, wherein the processor and the plurality of set top boxes are located in a premises, and wherein the processor and the particular set top box are separate devices;

determining a history of video formats for video content viewed at the particular set top box;

transcoding the media content from a first format into a target format responsive to the preference and the history of video formats, wherein the transcoding is performed, without user intervention, in response to the insertion of the optical storage medium into the optical drive; and transmitting the media content in the target format from the processor to the particular set top box without sending the media content to other set top boxes of the plurality of set top boxes, wherein the transmitting of the media content is performed, without user intervention, in response to the insertion of the optical storage medium into the optical drive.

2. The non-transitory computer-readable storage medium of claim 1, wherein the transcoding comprises coding the first format into an intermediate format and coding the intermediate format into the target format.

3. The non-transitory computer-readable storage medium of claim 1, wherein the operations further comprise:
receiving playback commands at the processor from the particular set top box; and
controlling presentation of the media content on a display device coupled to the particular set top box based on the playback commands.

4. The non-transitory computer-readable storage medium of claim 1, wherein the operations further comprise selecting the media content from a plurality of media content stored on the optical storage medium, wherein the selecting of the media content is based on a designation of the media content that is pre-determined and stored in the processor prior to the insertion of the optical storage medium in the optical drive.

5. The non-transitory computer-readable storage medium of claim 1, wherein the operations further comprise:
querying a sources over the Internet for information associated with the media content; and
providing a user of the particular set top box with access to the information.

6. The non-transitory computer-readable storage medium of claim 5, wherein the information is selected from a group consisting of a video blog, a pod cast, a website, a sequel to a movie, a prequel to the movie, a different version of a movie and another movie in a common genre.

7. The non-transitory computer-readable storage medium of claim 1, wherein the operations further comprise obtaining the preference of the particular set top box from pre-determined preference information stored in the processor.

8. A set top box, comprising:
a memory to store computer instructions; and
a controller in communication with the memory, wherein the controller, responsive to executing the computer instructions, performs operations comprising:
receiving media content from a processor when the media content satisfies a ratings threshold, wherein the processor selects the set top box to receive the media content from a plurality of set top boxes by determining whether the ratings threshold is satisfied, the media content being read from an optical storage medium and transmitted, without user intervention, to the controller upon insertion into an optical drive of the processor, wherein the processor and the plurality of set top boxes are located in a premises, and wherein the processor and the set top box are separate devices;
receiving, from the processor, information associated with the media content, the information being obtained by the processor from a query of source over the Internet; and
providing a user of the set top box with access to the information.

9. The set top box of claim 8, wherein the operations further comprise receiving the media content from the processor in a target format, wherein the processor adjusts the media content into the target format responsive to preference information to present the media content, the preference information being associated with device parameters, wherein the device parameters are selected from a group consisting of the set top box and a display device coupled to the set top box.

10. The set top box of claim 8, wherein the operations further comprise:
providing the processor with preference information to present the media content; and
receiving the media content from the processor in a target format, wherein the processor transcodes the media content into the target format responsive to the preference information.

11. The set top box of claim 10, wherein the preference information is stored in the set top box.

12. The set top box of claim 8, wherein the information is selected from a group consisting of a video blog, a pod cast and a website.

13. The set top box of claim 8, wherein the information is selected from a group consisting of a sequel to a movie, a prequel to the movie, a different version of a movie and another movie in a common genre.

14. The set top box of claim 8, wherein the operations further comprise:
presenting on a display device a user interface to accept playback commands to control presentation of the media content; and
transmitting the playback commands to the processor, wherein the processor performs the playback commands to control presentation of the media content on the display device.

15. The set top box of claim 8, wherein the media content is selected by the processor from a group of media content stored on the optical storage medium based on a designation, the designation being pre-determined and stored prior to the insertion of the optical storage medium into the optical drive.

16. A communication device, comprising:
an optical drive;
a memory to store computer instructions; and
a controller in communication with the memory, wherein the controller, responsive to executing the computer instructions, performs operations comprising:
reading media content from an optical storage medium inserted into the optical drive;
determining a content type of the media content;
selecting a particular set top box from a plurality of set top boxes to receive the media content, wherein the selection of the particular set top box is based on the content type of the media content, wherein the selection of the particular set top box is performed, without user intervention, in response to the insertion of the optical storage medium into the optical drive;
obtaining, responsive to the content type of the media content, a preference of a plurality of preferences of the particular set top box to present the media content;
adjusting the media content from a first format into a target format responsive to the preferences; and
transmitting the media content in the target format to the particular set top box without sending the media content to other set top boxes of the plurality of set top boxes, wherein the adjusting and transmitting of the media content is in response to insertion of the optical storage medium into the optical drive without user intervention, and wherein the controller and the plurality of set top boxes are separate devices located in a premises.

17. The communication device of claim 16, wherein the operations further comprise:
receiving playback commands from the particular set top box; and
controlling presentation of the media content on a display device coupled to the particular set top box based on the playback commands.

18. The communication device of claim 16, wherein the operations further comprise transcoding the media content into the target format.

19. The communication device of claim 16, wherein the operations further comprise:
querying a source over the Internet for information associated with the media content; and
providing a user of the particular set top box with access to information.

20. The communication device of claim 19, wherein the information is selected from a group consisting of a video blog, a pod cast and a website.

21. The communication device of claim 19, wherein the information is selected from a group consisting of a sequel to a movie, a prequel to a movie, a different version of a movie and another movie in a common genre.

22. The communication device of claim 16, wherein the operations further comprise:
obtaining the preference of the particular set top box from pre-determined preference information; and
determining a history of video formats for video content viewed at the particular set top box, wherein the adjustment of the media content is based in part on the history of video formats.

23. A method, comprising:
providing, by a set top box comprising a first processor, to a second processor a preferences of the set top box to present media content, the media content having been read from an optical storage medium inserted into an optical drive of the second processor, wherein the second processor and the set top box are located in a premises;
receiving, by the set top box, the media content in a target format from the second processor when the media content satisfies a ratings threshold, wherein the set top box is selected by the second processor from a plurality of set top boxes to receive the media content by determining whether the ratings threshold is satisfied, and wherein the second processor and the plurality of set top boxes are separate devices located in the premises, the target format having been generated, without user intervention, by the second processor from a previous format of the media content responsive to the preferences upon insertion of the optical storage medium into the optical drive of the second processor; and
transmitting, by the set top box, playback commands to the second processor to control presentation of the media content on a display device coupled to the set top box.

24. The method of claim 23, further comprising:
obtaining, by the set top box, a designation that is stored prior to the insertion of the optical storage medium into the optical drive;
selecting, by the set top box, the media content from a group of media content that is stored on the optical storage medium based on the designation;
receiving, by the set top box, from the second processor, information associated with the media content, the information having been obtained by the second processor from a query over the Internet; and
providing the set top box with access to the information.

25. A method, comprising:
reading, by a system comprising a processor, media content from an optical storage medium inserted into an optical drive of a processor;
determining, by the system, a content type of the media content;
selecting, by the processor, a particular set top box from a plurality of set top boxes to receive the media content, wherein the selecting of the particular set top box is based on the content type of the media content, wherein the selecting of the particular set top box is performed, without user intervention, in response to the insertion of the optical storage medium into the optical drive;
receiving, by the system, preference information from the particular set top box, the preference information being responsive to the content type of the media content and associated with a format to present the media content by the particular set top box, wherein the system and the plurality of set top boxes are located in a premises, and wherein the system and the particular set top box are separate devices;
adjusting, by the system, the media content from a current format into a target format based on the preference information, wherein the adjusting of the media content is performed, without user intervention, in response to the insertion of the optical storage medium into the optical drive;
transmitting, by the system, the media content in the target format from the system to the particular set top box without sending the media content to other set top boxes of the plurality of set top boxes;
receiving, by the system, playback commands from the set top box; and
controlling, by the system, presentation of the media content on a display device coupled to the particular set top box based on the playback commands, wherein the adjusting and transmitting of the media content is in response to insertion of the optical storage medium into the optical drive.

* * * * *